(12) United States Patent
Lampl et al.

(10) Patent No.: US 11,352,928 B2
(45) Date of Patent: Jun. 7, 2022

(54) VALVE DEVICE

(71) Applicant: MSG Mechatronic Systems GmbH, Wies (AT)

(72) Inventors: Ewald Lampl, Wies (AT); Daniel Theussl, Deutschlandsberg (AT)

(73) Assignee: MSG MECHATRONIC SYSTEMS GMBH, Wies (AT)

( * ) Notice: Subject to any disclaimer, the term of this patent is extended or adjusted under 35 U.S.C. 154(b) by 0 days.

(21) Appl. No.: 17/267,951

(22) PCT Filed: Jun. 27, 2019

(86) PCT No.: PCT/AT2019/060213
§ 371 (c)(1),
(2) Date: Feb. 11, 2021

(87) PCT Pub. No.: WO2020/051603
PCT Pub. Date: Sep. 19, 2020

(65) Prior Publication Data
US 2021/0189938 A1      Jun. 24, 2021

(30) Foreign Application Priority Data

Sep. 10, 2018  (AT) .......................... GM 50152/2018

(51) Int. Cl.
*F01N 3/22* (2006.01)
*F16K 31/126* (2006.01)
(Continued)

(52) U.S. Cl.
CPC ............... *F01N 3/227* (2013.01); *F01N 3/30* (2013.01); *F16K 31/1262* (2013.01); *G05D 16/0683* (2013.01)

(58) Field of Classification Search
CPC . F01N 3/222; F01N 3/227; F01N 3/30; F01N 3/32; F16K 31/1262; F16K 31/1266
See application file for complete search history.

(56) References Cited

U.S. PATENT DOCUMENTS

| | | | |
|---|---|---|---|
| 3,983,697 A | | 10/1976 | Goto et al. |
| 4,309,022 A | * | 1/1982 | Reinicke ................. F16K 31/56 251/63.4 |
| 4,678,007 A | * | 7/1987 | Ransom .............. F16K 31/1262 251/75 |

(Continued)

FOREIGN PATENT DOCUMENTS

| | | |
|---|---|---|
| DE | 1003157 | 2/1957 |
| DE | 960082 | 3/1957 |

(Continued)

OTHER PUBLICATIONS

Machine translation of DE 960082 C, accessed Feb. 9, 2022. (Year: 2022).*

(Continued)

*Primary Examiner* — Jonathan R Matthias
(74) *Attorney, Agent, or Firm* — Greenblum & Bernstein, P.L.C.

(57) ABSTRACT

Valve device, in particular for an exhaust gas section of an internal combustion engine, includes a valve housing with an inlet and outlet, a valve seat arranged between the inlet and outlet and having a valve opening, closeable by a valve closing member pressed against the valve seat by a predetermined force, and a diaphragm acting on the valve closing member. A first control chamber is separated from a second control chamber by the diaphragm so that the valve is switched by a pressure difference between the first control chamber and second control chamber. For reliable opening even under adverse operating conditions, the diaphragm is connected to the valve closing member, at least over a partial range of a possible stroke of the valve closing member, via a gear mechanism to translate movement of the diaphragm into movement of the valve closing member at a lower speed.

14 Claims, 5 Drawing Sheets

Figure 1:
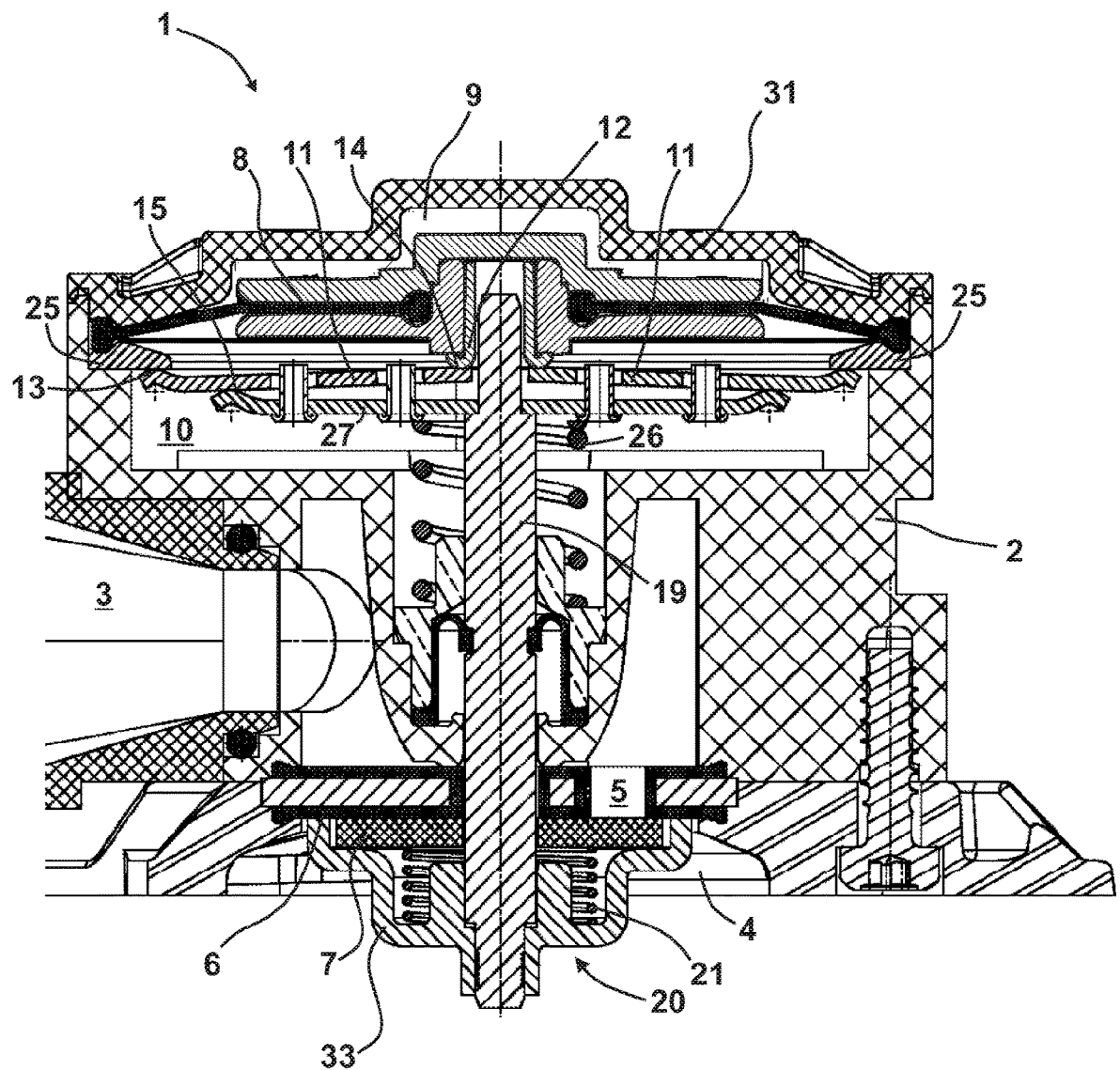

(51) Int. Cl.
  *F01N 3/30*   (2006.01)
  *G05D 16/06*   (2006.01)

(56) References Cited

U.S. PATENT DOCUMENTS

| | | | |
|---|---|---|---|
| 4,684,103 A | | 8/1987 | Baumann |
| 5,829,473 A | * | 11/1998 | Hajbi .................. F16K 31/1266 |
| | | | 251/61.4 |
| 2009/0020724 A1 | | 1/2009 | Paffrath |
| 2011/0155250 A1 | * | 6/2011 | Nannan .................. F16K 31/122 |
| | | | 137/553 |

FOREIGN PATENT DOCUMENTS

| | | |
|---|---|---|
| DE | 3040905 | 6/1981 |
| DE | 101 48 384 | 4/2003 |
| DE | 10 2007 048365 | 4/2009 |
| EP | 1 046 797 | 10/2000 |
| EP | 2 014 887 | 1/2009 |
| GB | 1012174 | 12/1965 |

OTHER PUBLICATIONS

Int'l Search Report (Form PCT/ISA/210) conducted in Int'l Appln. No. PCT/AT2019/060213 (dated Oct. 9, 2019).
Int'l Written Opinion (Form PCT/ISA/237) conducted in Int'l Appln. No. PCT/AT2019/060213 (dated Oct. 9, 2019).
Int'l Prelim. Exam. Report (Form PCT/IPEA/409) conducted in Int'l Appln. No. PCT/AT2019/060213 (dated Sep. 28, 2020).
China Search Report and Office Action conducted in counterpart China Appln. No. 201980058274.4 (dated Jan. 24, 2022) w/translation.

* cited by examiner

VALVE DEVICE

The invention relates to a valve device, in particular a secondary air valve for an exhaust gas section of an internal combustion engine, comprising a valve housing with an inlet and an outlet, a valve seat which is arranged between the inlet and the outlet and comprises a valve opening, which valve opening can be closed by a valve closing member that is pressed against the valve seat by means of a predetermined force, and a diaphragm which acts on the valve closing member, wherein a first control chamber is separated from a second control chamber by the diaphragm, as a result of which the valve device can be switched by means of a pressure difference between the first control chamber and the second control chamber.

Valve devices of the type named at the outset are known from the prior art, in particular from the document DE 101 48 384 A1. When a valve device of this type is used, typically as a secondary air valve in an exhaust gas system of a motor vehicle, it has proven disadvantageous that the valve closing member, in particular due to contaminants in the exhaust gas that are deposited on the valve seat, sticks to the valve seat so that a reliable opening of the valve device cannot be ensured without increasing an area of the diaphragm such that a correspondingly greater force is achieved via a pressure difference which acts on the larger area of the diaphragm. This, however, also has the disadvantage that an installation space of the valve device is adversely enlarged.

This is addressed by the invention. The object of the invention is to specify a valve device of the type named at the outset which ensures a reliable opening even for use in an exhaust gas section of a motor vehicle and at the same time has a small installation space.

According to the invention, this object is attained by a valve device of the type named at the outset in which the diaphragm is connected to the valve closing member, at least over a partial range of a possible stroke of the valve closing member, via a gear mechanism that is embodied such that a movement of the diaphragm is translated into a movement of the valve closing member at a lower speed.

Over the course of the invention, it was discovered that, through the use of a gear mechanism, or a mechanism with which momenta are changed, between the diaphragm and the valve closing member, which gear mechanism comprises a translation of a movement of the diaphragm into a movement of the valve closing member of less than 1:1, as a result of which the speed of the valve closing member is lower than the speed of the diaphragm, a corresponding force transmission of more than 1:1 is achieved, so that a force with which the valve closing member is moved is greater than a force with which the diaphragm acts on the gear mechanism as a result of the pressure difference between the first control chamber and second control chamber, which pressure difference acts on the diaphragm surface.

In this manner, a large force can also be supplied for opening the valve device with a small diaphragm surface area, so that the valve device can be opened even if the valve closing member sticks or adheres to the valve seat, in order to produce a fluidic connection between the inlet and outlet. A movement of the valve closing member thus occurs more slowly than a movement of the diaphragm.

The diaphragm is typically embodied to be roughly circular and connected to the valve housing stationarily or rigidly at an edge, normally by a diaphragm clamping cover which presses the diaphragm against a counterbearing at a perimeter, so that a central region of the diaphragm performs a maximum movement in the event of a difference in pressure. Normally, this central region of the diaphragm is coupled with the valve closing member via the gear mechanism, for which reason a speed or movement of this central region, or of a region of the diaphragm that exhibits a maximum deflection when pressure is applied, is in this case understood as the speed or movement of the diaphragm.

It is beneficial if a transmission ratio of the gear mechanism is not constant over the stroke of the valve closing member. A stroke of the valve closing member is understood to be a distance which the valve closing member travels between a closed position, in which the valve closing member bears against the valve seat in a sealing manner, and an open position, in which a further movement of the valve closing member away from the valve seat is not possible, for example due to a stop. Typically, an opening movement of the valve closing member runs along a straight line in an opening direction.

The transmission ratio of the gear mechanism, which is a ratio of a distance or speed of the diaphragm, which is connected to the gear mechanism on the input side, to a distance or speed of the valve closing member, which is connected to the gear mechanism on the output side, can then be adapted in a targeted manner to a necessary force, which is possibly variable over the stroke of the valve closing member, for opening the valve closing member and for maintaining a desired open state.

Over the stroke, a force for opening the valve closing member is in particular dependent on contaminants between the valve closing member and the valve seat, as well as fluid-mechanical effects during the outflow of a fluid through the valve opening.

In addition, the force for moving the valve closing member can also be dependent on a device with which the valve closing member is pressed onto the valve seat if there is no pressure difference between the first control chamber and the second control chamber. Normally, a force for opening the valve closing member is at a maximum at the start of the stroke, that is, with a closed valve device, when the valve closing member bears against the valve seat in a sealing manner.

Typically, the valve closing member is pretensioned against the valve seat with a spring, in particular a helical spring, so that with the pressure difference between the first control chamber and the second control chamber the pretensioning force of this spring must also be overcome in order to open the valve device. Thus, the force of the spring opposing the opening movement can also increase over a stroke of the valve closing member. This can also be accounted for in a selection of a stroke-dependent transmission ratio.

As an alternative to a helical spring, the valve closing member can of course also be pressed onto the valve seat in the closed position of the valve device using a wide range of other devices in order to tightly close the valve device, for example with a device that utilizes a magnetic force.

To simultaneously ensure a reliable opening of the valve closing member from the closed position, in which the valve closing member bears against the valve seat in a sealing manner, as well as a rapid opening up until a maximum stroke, it is advantageous if the transmission ratio is less than 1:1 for a closed valve device and is greater at a maximum stroke than for the closed valve device. Accordingly, a ratio of the force transmitted from the diaphragm to the gear mechanism to the force transmitted from the gear mechanism to the valve device is inverse to the transmission ratio of the gear mechanism, in terms of distances and speeds, from the diaphragm to the valve closing member, which is why, with a transmission ratio of less than 1:1 for a closed valve device and a greater transmission ratio at maximum stroke, a large force for disengaging the valve closing member from the valve seat at the start of the stroke and a high speed in an end range of the stroke are achieved with constant pressure ratios in the control chambers. A force that acts on the valve closing member at the start of the stroke is therefore greater than the force delivered to the gear mechanism by the diaphragm.

In terms of design, a variable transmission across the stroke of the valve closing member can be achieved in a particularly simple manner if the diaphragm is rigidly connected to the valve closing member starting at a predefined stroke. A connection of the diaphragm to the gear mechanism or the valve closing member typically occurs via a point on the diaphragm that exhibits a maximum deflection when pressure is applied, normally via a center of the diaphragm. For example, it can be provided that a predefined portion of a stroke of the diaphragm is possible starting from a first end position of the diaphragm, wherein the diaphragm acts only on the gear mechanism in the direction of movement, after which, from the predefined portion of the stroke of the diaphragm on, the diaphragm, or an element that is rigidly connected to the diaphragm and engages with the diaphragm in a roughly central manner, bears against an element, in particular a valve stem, that is rigidly connected to the valve closing member, as a result of which the gear mechanism is bypassed and a movement of the diaphragm is transmitted 1:1 to the valve closing member.

Typically, both the diaphragm and also the valve closing member are embodied with roughly a circular cross section, and a movement of the diaphragm is transmitted via an element, in particular a valve stem, arranged symmetrically to a longitudinal axis, which longitudinal axis connects the centers of the diaphragm and the valve closing member.

Of course, the gear mechanism can in principle be embodied in a wide range of different ways, in particular as a crank gear, cam gear, gear train, roller gear, or screw gear. Furthermore, the gear mechanism can be embodied as any desired mechanism with witch a change or transformation of momenta is possible. In one particularly simple embodiment, the gear mechanism can also be formed solely by a lever that can be rotated about a rotation axis, wherein the diaphragm, in particular a region of the diaphragm at which the diaphragm exhibits a maximum deflection, acts on the lever at a first application point distant from the rotation axis, and a movement of the lever is transmitted to the valve closing member at a second application point, wherein the second application point has a smaller distance from the rotation axis of the lever than the first application point. Preferably, the lever is then positioned such that the rotation axis is rigidly connected to the valve housing.

It has proven particularly beneficial if the gear mechanism comprises a lever which, at least over a partial range of a possible stroke, is connected on the one side to a first contact position that is rigidly connected to the valve seat and on the other side is connected to a second contact position that is rigidly connected to the diaphragm, wherein a pressure plate is provided which at a third contact position is connected to the lever and, typically rigidly in an opening direction, to the valve closing member, so that the pressure plate transfers a movement of the lever to the valve closing member at the third contact position. The transmission ratio can then, in a particularly simple manner of design, be predefined by a ratio of a second distance between the first contact position and the third contact position to a first distance between the first contact position and the second contact position. Here, an opening direction is understood as a direction along which the valve closing member is moved away from the valve seat in order to clear the valve opening and fluidically connect the inlet to the outlet.

The lever and pressure plate can, in particular at the contact positions, be moveably connected to one another and to other parts of the valve device such that in an opening or closing movement of the valve device, the lever and pressure plate execute a movement relative to one another at contact surfaces or slide against one another. To minimize frictional losses thereby, it can be provided that the lever(s) and/or the pressure plate are provided with a suitable coating and/or are composed of a suitable material so that low-friction material combinations occur at contact surfaces.

It has proven effective that a first distance between the first contact position and the second contact position is greater than a second distance between the first contact position and the third contact position, so that a movement of the diaphragm can be transmitted to the valve closing member corresponding to a ratio of the second distance to the first distance. Typically, a ratio of the second distance to the first distance is approximately 0.1 to 0.9, preferably 0.2 to 0.4, in particular approximately 0.25. The lever is connected to the contact positions typically in a positive fit in the opening direction, so that a force can be transmitted from the diaphragm to the valve closing member in the opening direction. For example, the lever can simply bear against the contact positions so that a corresponding force can be transmitted.

It is beneficial if two or more levers are provided which are arranged roughly symmetrically to a central axis of the diaphragm. A central axis of the diaphragm typically also corresponds to a central axis of the, normally circularly embodied, valve closing member. To ensure that production can be particularly simple, it is preferably provided that, even with multiple levers, a single pressure plate is arranged such that a movement of the levers at the respective third contact positions on the contact plate is transmitted via the pressure plate to the valve closing member, or to the valve stem to which the valve closing member is typically rigidly connected. In addition to the connection to the lever at the third contact position, the pressure plate can also be connected to the lever at other positions such that it can be displaced in the opening direction, in order to define a position of the lever(s) relative to the pressure plate. To define a position of the pressure plate relative to the valve closing member, the pressure plate can be connected to the valve stem in a positive fit, which valve stem is connected to the valve closing member.

To achieve varying transmissions over a stroke of the valve closing member in a simple manner, it is beneficial if, starting at a predefined stroke, the diaphragm bears against a component, in particular a valve stem, that is rigidly connected to the valve closing member, so that from this predetermined stroke on, a movement of the diaphragm can be transmitted directly to the valve closing member. Thus, a simple gear mechanism, which can for example be formed by a lever, can be used with constant transmission, which gear mechanism is bypassed starting at the predetermined stroke as a result of the diaphragm bearing against the component that is rigidly connected to the valve closing member, so that varying transmissions are ensured across the stroke, namely a transmission defined by the gear mechanism until the diaphragm bears against the valve stem or until a positive-fit connection of the diaphragm to the valve stem in the opening direction on the one hand, and on the other hand a 1:1 transmission starting from when the diaphragm bears against the component that is rigidly connected to the valve closing member. It can also be provided that, from a predetermined stroke on, starting at which a transmission ratio is 1:1, the lever is disengaged from the first contact position in order to prevent adverse mechanical loading of the lever.

Alternatively, via a suitable embodiment of the lever arms, a multi-stage transmission can be achieved which attains a corresponding transmission ratio over the entire valve stroke.

It is beneficial if the valve closing member comprises a non-return valve so that, when the valve is open, a positive pressure in the outlet causes the opening to be closed by the non-return valve. It is thus ensured that, in the event that a positive pressure suddenly occurs in the exhaust gas system, no exhaust gas can escape into the secondary air line via the valve device.

The valve closing member can comprise a component that is rigidly connected to the valve stem and/or a component that is connected to the valve stem via a return spring. These components are typically connected in a fluid-mechanical series and are respectively suitable for closing the valve opening with respect to the outlet, as a result of which the valve device is then only open when a flow path from the inlet to the outlet has been cleared by both components. If the valve closing member comprises both a component that is rigidly connected to the valve stem and also a component that is connected to the valve stem via a return spring, a stroke of the valve closing member corresponds to a stroke of the component that is rigidly connected to the valve stem. A stroke of the component that is connected to the valve stem via the return spring, or a distance of this component from the valve seat, can thus differ from the stroke of the valve closing member, so that the valve device can be closed by the component that is connected to the valve stem via the return spring even when the component that is rigidly connected to the valve stem is located in a position at a distance from the valve seat. The component connected to the valve stem via the return spring can thus form the non-return valve.

For this purpose, the valve closing member typically comprises a valve bell that is rigidly connected to the valve stem and a valve plate that is arranged in the valve bell and connected to the valve bell via a return spring, and therefore also to the valve stem via the return spring and the valve bell. The valve bell and valve plate are, independently of one another, respectively suitable for closing the valve opening and closing the same flow path from the inlet to the outlet, so that the return spring and the valve plate form the non-return valve of the valve closing member. The valve closing member can then be rigidly connected to the valve stem at the valve bell, so that a movement of the valve stem is transmitted 1:1 to a movement of the valve bell and a stroke of the valve closing member corresponds to a stroke of the valve bell. If a positive pressure is present in the inlet vis-á-vis the outlet, an opening movement of the valve stem is also transmitted 1:1 to the valve plate. However, if a positive pressure is present in the outlet vis-á-vis the inlet, a movement of the valve stem in the opening direction merely causes a corresponding stroke of the valve bell, but not an opening of the valve plate, which is connected to the valve bell via the return spring such that the valve plate can typically be moved parallel to the opening direction. The valve plate is then held in a closed position, in which the valve plate closes the valve opening, by the positive pressure of the outlet vis-á-vis the inlet in conjunction with the return spring. As a result, a flow of exhaust gas into the secondary air line via the valve device is prevented in a simple manner.

It has proven effective that the first control chamber is connected to the inlet via an electrical control valve, so that the first control chamber can be connected to a secondary air line via the electrical control valve when the valve device is used in a motor vehicle. A positive pressure is typically present in the secondary air line, which pressure can possibly be supplied by a secondary air pump, so that through an actuation of the control valve a positive pressure can be produced in the first control chamber vis-á-vis the second control chamber in order to switch the valve device with an actuation of the electrical control valve. Thus, if a pressure of the inlet is applied to the first control chamber, the valve is opened and if the electrical control valve is closed and the pressure in the first control chamber and second control chamber is equalized, the valve is closed by a device with which a force can be applied to the valve closing member in the direction of the valve seat, typically a device that is embodied as a helical spring.

It is preferably provided that the first control chamber is connected to an ambient environment via a vent line when the electrical control valve is closed, so that the first control chamber is not connected to the inlet. Preferably, the electrical control valve is embodied such that the connection between the first control chamber and the vent line is interrupted when the electrical control valve is open and the first control chamber is connected to the inlet, as a consequence of which the inlet is fluidically disconnected from an ambient environment at each end position of the electrical control valve.

To enable the valve device to be used in an exhaust gas system of a motor vehicle in a simple manner without additional measures, it is beneficial if the valve device can be opened at a positive pressure in the first control chamber of at least 0.3 bar, in particular 0.5 bar, vis-á-vis the second control chamber. Typically, secondary air lines in motor vehicles have a corresponding positive pressure, so that the valve device can then easily be used in a motor vehicle. Naturally, a device for closing the valve device, in particular a spring; the diaphragm; and the gear mechanism must be appropriately coordinated with one another for this purpose.

To allow an effective emission control to be ensured for a motor vehicle, it is beneficial if, in a motor vehicle having a secondary air valve with which secondary air can be introduced into an exhaust gas system installed downstream of an internal combustion engine, the secondary air valve is embodied as a valve device according to the invention. In this manner, a reliable opening and closing of the secondary air valve can be ensured and, at the same time, a small installation space can be achieved.

Figure 2:
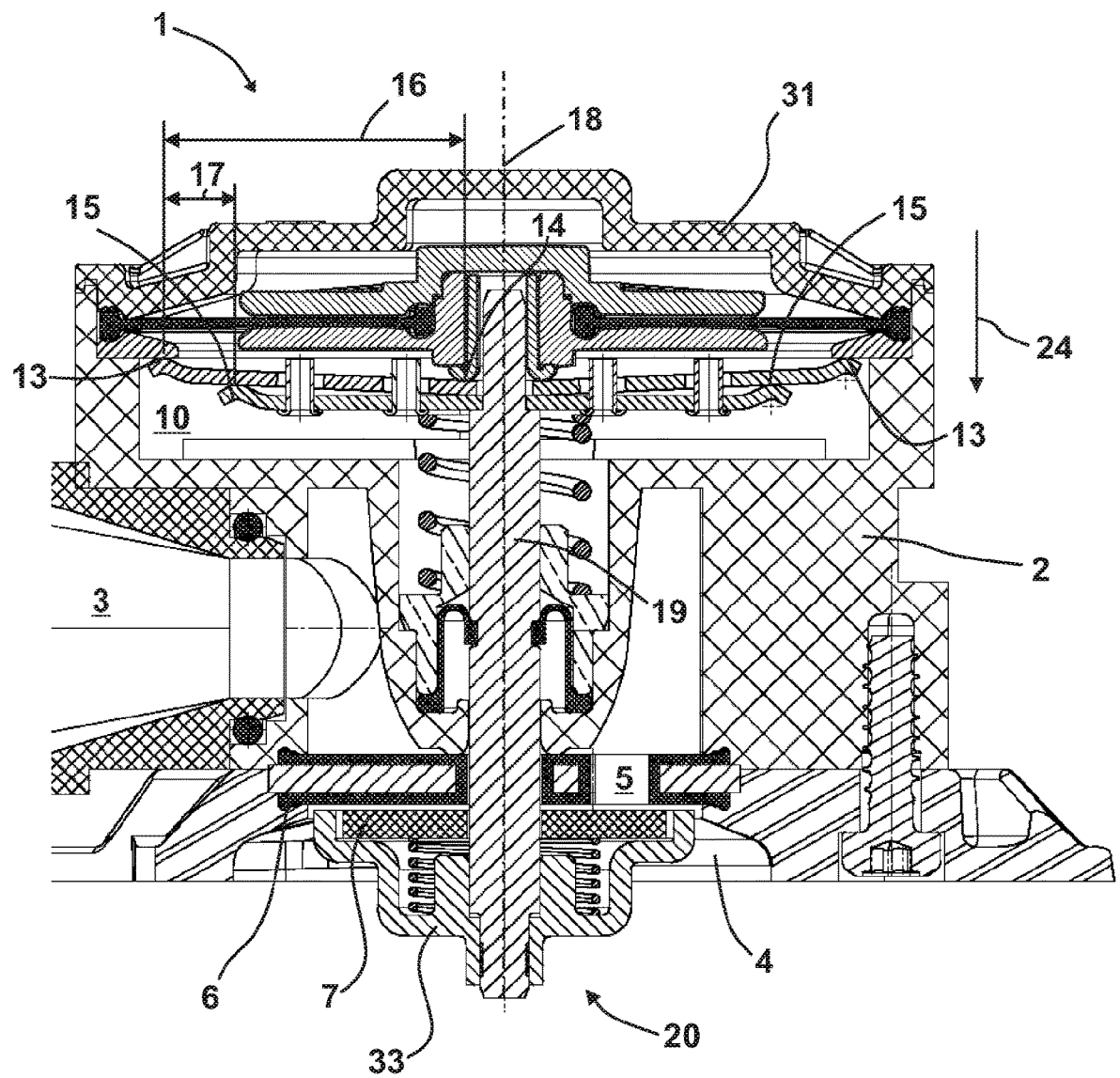
Figure 3:
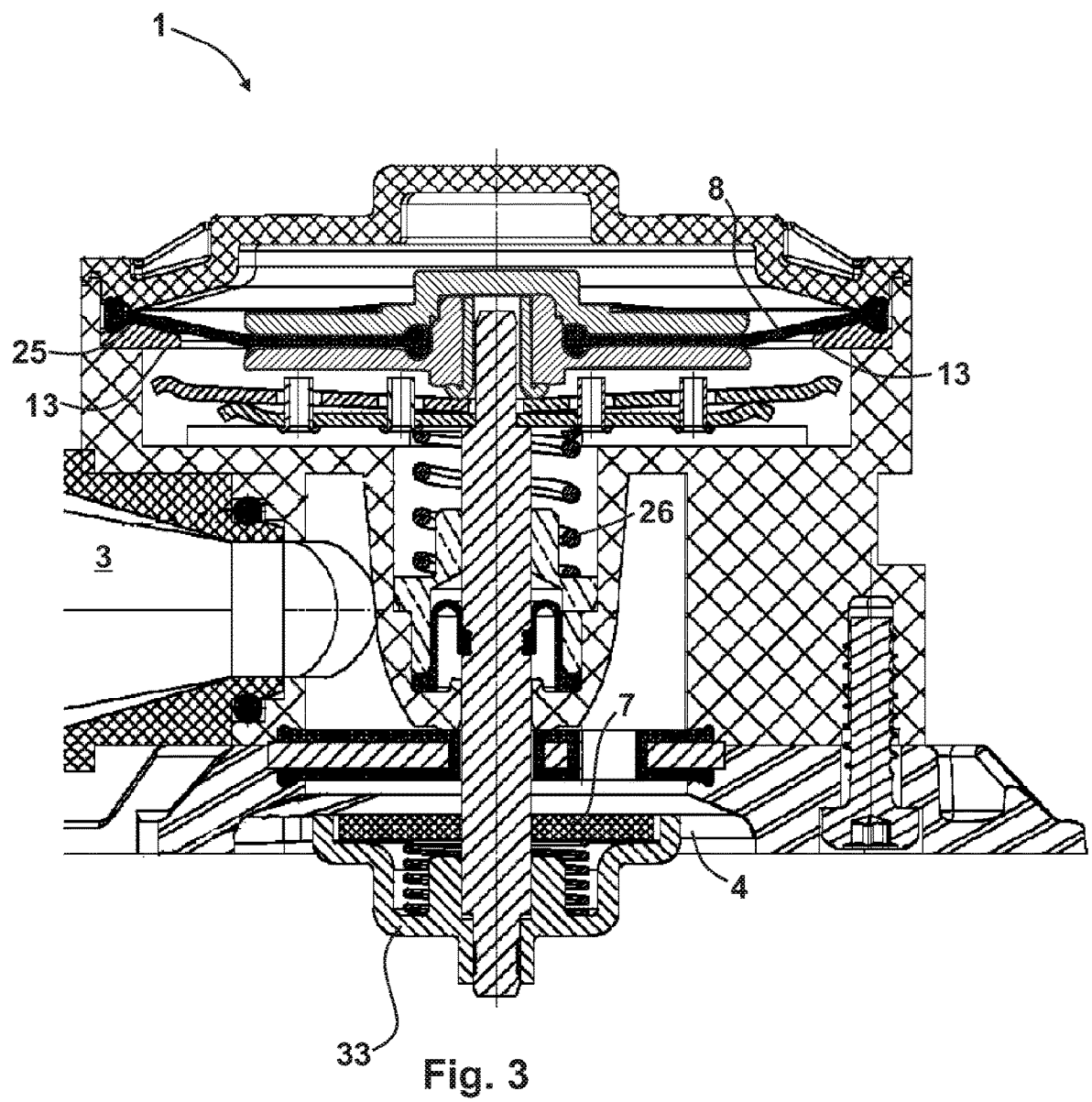
Figure 4:
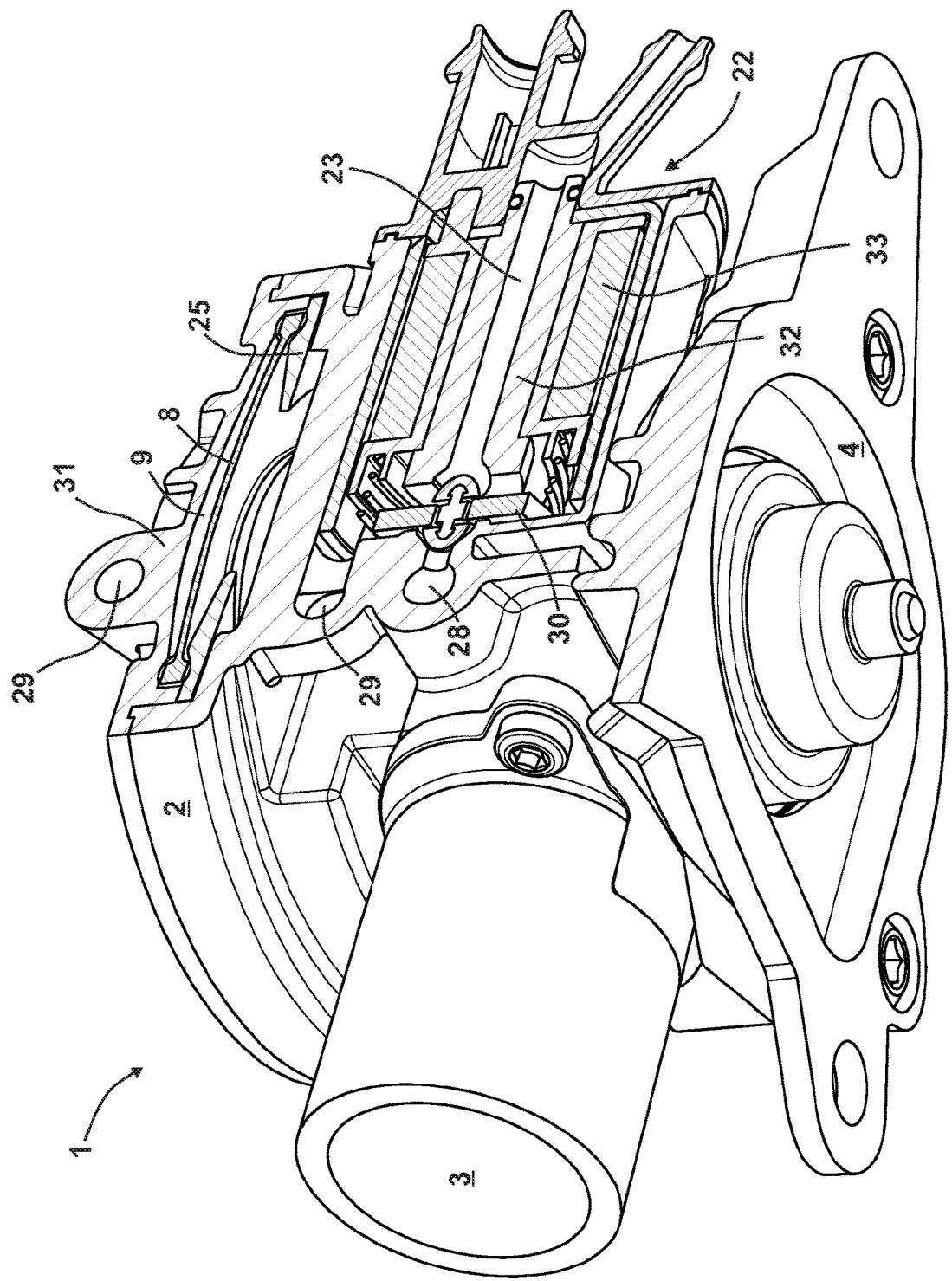
Figure 5:
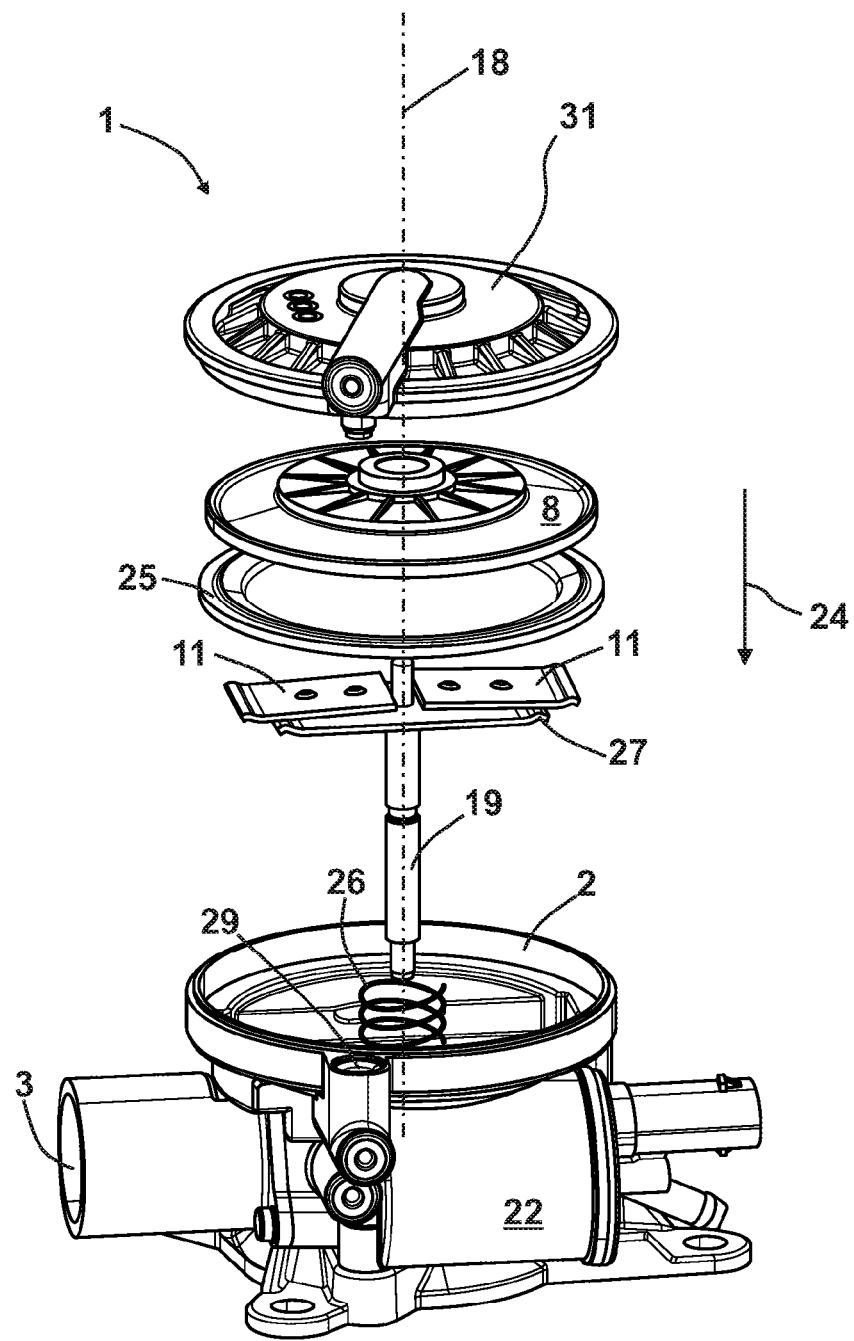

Additional features, advantages, and effects follow from the exemplary embodiments described below. The drawings which are thereby referenced show the following:

FIG. 1 A valve device according to the invention in a closed working position;

FIG. 2 A valve device according to the invention in a breakaway position;

FIG. 3 A valve device according to the invention in an open working position;

FIG. 4 A valve device according to the invention in an isometric sectional view;

FIG. 5 A valve device according to the invention in an exploded view.

FIGS. 1 through 3 show the valve device 1 in a sectional view. As can be seen, the valve device 1 comprises a valve housing 2 with a diaphragm clamping cover 31, an inlet 3 which can typically be connected to a secondary air line, and an outlet 4 which can be connected to an exhaust gas system of a motor vehicle, wherein a fluidic connection is possible between the inlet 3 and the outlet 4 via a valve seat 6 comprising a valve opening 5. The valve opening 5 can be closed by a valve closing member which comprises a valve bell 33 and a valve plate 7 arranged in the valve bell 33, in that the valve bell 33 and/or the valve plate 7 are pressed onto the valve seat 6, which is normally composed of an elastomer.

The valve closing member, which in this case is composed of the valve bell 33, the valve plate 7, and a return spring 21 connecting the valve bell 33 and the valve plate 7, is rigidly connected to the valve stem 19 at the valve bell 33. Thus, when the valve plate 7 is open and the valve bell 33 is open, a positive pressure in the outlet 4 vis-á-vis the inlet 3 causes a closing of the valve plate 7 and therefore a movement of the valve plate 7 relative to the valve bell 33 against the opening direction 24. With the return spring 21 and the valve plate 7, a non-return valve 20 is thus formed in the valve closing member, as a result of which it is ensured that the open valve plate 7 is closed when there is a positive pressure in the outlet 4 vis-á-vis the inlet 3, in order to prevent an outflow of exhaust gas into the inlet 3. The non-return valve 20 formed by the valve plate 7 and return spring 21 thus acts parallel to the valve bell 33, so that the valve device 1 is only open when both the non-return valve 20 and also the valve bell 33 are open.

The valve stem 19 is connected to a diaphragm 8, which is normally composed of an elastomer, via a pressure piece 12 that acts on two levers 11 and a pressure plate 27 that is connected to each lever 11 at a third contact position 15. In the closed position illustrated in FIG. 1, in which the valve plate 7 and the valve bell 33 bear tightly against the valve seat 6, the levers 11 are only connected to the pressure plate 27 at the third contact position 15, though the levers 11 are spaced apart from the pressure plate 27 in an end region that is connected to the diaphragm 8 via the pressure piece 12. A movement of the diaphragm 8 thus cannot be transmitted 1:1 to the valve stem 19, but rather merely causes a movement of the levers 11.

Thus, in the position illustrated in FIG. 1, the diaphragm 8 is, in the opening direction 24, kinematically only indirectly connected to the valve stem 19, namely via the levers 11 and a pressure plate 27. Acting on the diaphragm 8, which is clamped in the valve housing 2 at a perimeter by the diaphragm clamping cover 31 on the one side and a counterbearing 25 on the other side, are on the one hand a pressure of a first control chamber 9 and on the other hand a pressure of a second control chamber 10, so that a pressure difference between the first control chamber 9 and the second control chamber 10 produces a resultant force on the diaphragm 8, which is arranged in a central region in the housing such that it can be moved in the opening direction 24, as a result of which this central region is deflected.

Thus, starting from a closed position of the valve device 1 according to FIG. 1, a movement of the diaphragm 8 in the opening direction 24 of the valve plate 7, or downwards in the arrangement illustrated in FIG. 1, leads to a movement of the valve stem 19, which movement is translated vis-á-vis the movement of the diaphragm 8 by a gear mechanism formed by the levers 11 and the pressure plate 27, wherein a transmission ratio is less than 1:1 in the illustrated arrangement. Here, a transmission ratio is defined by a ratio of a travel distance of the diaphragm 8 to a resultant travel distance of the valve stem 19, namely approximately at a central axis 18 that intersects centers of the roughly circular diaphragm 8 and the roughly circular valve plate 7, or at a region in which the diaphragm 8 exhibits a maximum deflection when pressure is applied. The central axis 18 is typically parallel to the opening direction 24.

A force transmission ratio, that is, a ratio of a magnitude of a force applied to the gear mechanism by the diaphragm 8 on the input side to the magnitude of the force delivered to the valve stem 19 from the gear mechanism on the output side is accordingly greater than 1:1, typically approximately 1.5 to 10, preferably 3 to 6.

The transmission ratio is achieved in that, in this position, the levers 11 bear against a fixed counterbearing 25 at a first contact position 13 on the one side, which counterbearing 25 is rigidly connected to the valve seat 6 and the valve housing 2. On the other side, the levers 11 are respectively mounted on a second contact position 14 that is essentially rigidly connected via the pressure piece 12 to a part of the diaphragm 8 which is maximally deflected when pressure is applied.

In the closed position of the valve device 1 illustrated in FIG. 1, the pressure plate 27, which is connected to the valve stem 19 in a rigid manner in the opening direction 24 and is typically composed of a metal, in particular steel, is kinematically connected in the opening direction 24 to the levers 11, each at a third contact position 15, wherein as can also be seen in FIGS. 2 and 3, a first distance 16 between the first contact position 13 and the second contact position 14 is respectively greater than a second distance 17 between the first contact position 13 and the third contact position 15, so that a movement of the diaphragm 8 is translated into a movement of the pressure plate 27, and therefore a movement of the valve stem 19, at a transmission ratio corresponding to a ratio of the second distance 17 to the first distance 16, which is less than 1:1.

Because the transmission is less than 1:1, a speed of the pressure plate 27 during a movement out of the position illustrated in FIG. 1 is lower than a speed of the diaphragm 8, but a force of the valve stem 19 in the opening direction 24 is greater than a force applied by the diaphragm 8 to the levers 11 in the opening direction 24 at the second contact position 14. This enables a reliable opening of the valve bell 33, even if the same sticks to the valve seat 6, in particular due to contaminants in a region in which the valve bell 33 bears against the valve seat 6.

As can also be seen, a spring 26 is provided with which the diaphragm 8 together with the pressure plate 27 and the valve stem 19 as well as the valve closing member is pushed into a closed position, in which the valve plate 7 and the valve bell 33 are pressed onto the valve seat 6, in order to close the valve device 1 and to fluidically disconnect the inlet 3 from the outlet 4 when there is no pressure difference between the first control chamber 9 and the second control chamber 10. It is clear that the first control chamber 9 is fluidically disconnected from the second control chamber 10, namely by the diaphragm 8. Furthermore, the second control chamber 10 is fluidically disconnected from the inlet 3 and the outlet 4. A fluidic connection of the first control chamber 9 to the inlet 3, which has a positive pressure vis-á-vis the outlet 4, thus causes a positive pressure in the first control chamber 9 vis-á-vis the second control chamber 10 when a lower pressure is in the second control chamber 10 than in the inlet 3.

After a corresponding positive pressure is applied to the first control chamber 9, with which positive pressure a closing force of the spring 26 is overcome with the action of the gear mechanism, the valve device 1 initially reaches the state illustrated in FIG. 2. This state can also be referred to as the breakaway position, since in this case the valve plate 7 and the valve bell 33 are already disengaged from the valve seat 6 and the diaphragm 8 together with the levers 11 bearing against it at the second contact position 14 have overcome a clearance that is still present in the position illustrated in FIG. 1, as a result of which the levers 11 also bear against the pressure plate 27 at the end in the region of the valve stem 19. The diaphragm 8 is thus connected in a central region to the valve stem 19 in a positive fit in the opening direction 24 via the pressure piece 12, the levers 11, and the pressure plate 27. Every further movement of the diaphragm 8 is thus transmitted or translated 1:1 to the valve stem 19, both in terms of travel distance and speed and also in terms of force. Thus, from this predefined stroke on, a movement of the diaphragm 8 in the central region is transmitted 1:1 to the valve closing member, and therefore 1:1 to the valve bell 33 and, as long as the return spring 21 is not moved, also 1:1 to the valve plate 7. The stroke up until the breakaway position, starting at which the gear mechanism is bypassed in this manner and a transmission ratio is 1:1, is defined by the transmission ratio and the distance between an inner end of the levers 11 and the pressure plate 27 in the open position illustrated in FIG. 1.

As a result, a translation of less than 1:1 is attained through the gear mechanism up until the breakaway position and a translation of 1:1 is attained starting with the breakaway position, so that the valve can be opened with ample force on the one hand and can then be opened with high speed up until a complete stroke of the valve closing member or the valve bell 33.

In FIG. 3, an open state of the valve device 1 is illustrated in which the valve closing member, including the valve plate 7 and the valve bell 33, are located at a position of maximum stroke. As can be seen, in this operating state the levers 11 have disengaged from the first contact positions 13 on the fixed counterbearing 25 in order to prevent impermissibly high loads on the levers 11, and the valve plate 7 is separated from the valve seat 6 so that secondary air can flow into the outlet 4 through the valve opening 5 via the inlet 3.

FIG. 4 shows the valve device 1 according to the invention in an isometric sectional view, wherein in contrast to FIGS. 1 through 3, a sectional plane in this case does not intersect the central axis 18, but rather runs parallel to the central axis 18. As a result, an electrical control valve 22 can be seen with which the first control chamber 9 can be connected to the inlet 3 by application of an electric current to a coil and a resulting movement of an armature disc 30, in order to effect a targeted switching of the valve. A pressure take-off bore 28 is thereby directly connected to the inlet 3 so that, during an opening of the control valve 22 by a movement of the armature disc 30 to a pole core 32, a fluid, in particular a secondary air, can reach the control chamber bore 29 from the pressure take-off bore 28. The control chamber bore 29 is in turn connected to the first control chamber 9, typically through a diaphragm clamping cover 31.

In a closing of the control valve 22, the armature disk 30, which is normally composed of a metal, in particular steel, is moved so that the pressure take-off bore 28 is closed and, at the same time, a vent opening 23 is cleared. The first control chamber 9 is thus fluidically connected to the vent opening 23 via the control chamber bore 29, which also extends into the diaphragm clamping cover 31. In this manner, the first control chamber 9 can be vented so that the valve device 1 is once again closed by the spring 26 when the control valve 22 is closed.

FIG. 5 shows a valve device 1 according to the invention in an exploded view. As can be seen here, the diaphragm 8 is embodied to be roughly circular, and the levers 11, which are typically composed of a metal, are formed by small plates that are arranged symmetrically to the valve stem 19. The pressure plate 27, which is normally likewise composed of a metal, is also connected to the levers 11 in a positive fit on a plane perpendicular to the opening direction 24, in order to define a position of the levers 11 in the second control chamber 10 relative to the central axis 18. Additionally, the pressure plate 27 is connected to the valve stem 19 via a central bore, as a result of which the pressure plate 27 is connected in a positive fit to the valve stem 19 and a position of the pressure plate 27 relative to the valve stem 19 and to the central axis 18 is likewise clearly defined.

A valve device 1 according to the invention enables a reliable switching even when the same is used as a secondary air valve in a motor vehicle, wherein a small installation space is ensured at the same time. Furthermore, the device is very robust and is suitable for operating conditions in a motor vehicle with a simultaneously simple and cost-efficient design.

The invention claimed is:

1. A valve device comprising a valve housing with an inlet and an outlet, a valve seat which is arranged between the inlet and the outlet and comprises a valve opening, which valve opening can be closed by a valve closing member that is pressed against the valve seat by a predetermined force, and a diaphragm which acts on the valve closing member, wherein a first control chamber is separated from a second control chamber by the diaphragm, as a result of which the valve can be switched by a pressure difference between the first control chamber and the second control chamber, wherein the diaphragm is connected to the valve closing member, at least over a partial range of a possible stroke of the valve closing member, via a gear mechanism that is embodied such that a movement of the diaphragm is translated into a movement of the valve closing member at a lower speed, wherein the first control chamber is connected to the inlet via an electronic control valve, so that the first control chamber can be connected to a secondary air line via the electrical control valve when the valve device is used in a motor vehicle, wherein the first control chamber is connected to an ambient environment via a vent line when the electrical control valve is closed, so that the first control chamber is not connected to the inlet.

2. The valve device according to claim 1, wherein a transmission ratio of the gear mechanism is not constant over the stroke of the valve closing member.

3. The valve device according to claim 2, wherein the transmission ratio is less than 1:1 when the valve device is closed and is greater at a maximum stroke than when the valve device is closed.

4. The valve device according to claim 1, wherein the diaphragm is rigidly connected to the valve closing member starting at a predefined stroke.

5. The valve device according to claim 1, wherein the gear mechanism comprises a lever which, at least over a partial range of a possible stroke, is connected on the one side to a first contact position that is rigidly connected to the valve seat and on the other side is connected to a second contact position that is rigidly connected to the diaphragm, wherein a pressure plate is provided which at a third contact position is connected to the lever and, typically rigidly in an opening direction, to the valve closing member, so that the pressure plate transmits a movement of the lever to the valve closing member at the third contact position.

6. The valve device according to claim 5, wherein a first distance between the first contact position and the second contact position is greater than a second distance between the first contact position and the third contact position, so that a movement of the diaphragm can be transmitted to the valve closing member corresponding to a ratio of the second distance to the first distance.

7. The valve device according to claim 5, wherein two or more levers are provided which are arranged roughly symmetrically to a central axis of the diaphragm.

8. The valve device according to claim 1, wherein, starting at a predefined stroke, the diaphragm bears against a component that is rigidly connected to the valve closing member, so that from this predetermined stroke on, a movement of the diaphragm can be transmitted directly to the valve closing member.

9. The valve device according to claim 8, wherein the component is a valve stem.

10. The valve device according to claim 1, wherein the valve closing member comprises a non-return valve so that, when the valve is open, a positive pressure in the outlet causes the opening to be closed by the non-return valve.

11. The valve device according to claim 1, wherein the valve device can be opened at a positive pressure in the first control chamber of at least 0.3 bar vis-á-vis the second control chamber.

12. The valve device according to claim 11, wherein the valve device can be opened at a positive pressure in the first control chamber of 0.5 bar vis-á-vis the second control chamber.

13. A motor vehicle having a secondary air valve with which secondary air can be introduced into an exhaust gas system installed downstream of an internal combustion engine, wherein the secondary air valve is embodied according to claim 1.

14. The valve device according to claim 1, wherein the valve device is a secondary air valve for an exhaust gas section of an internal combustion engine.

\* \* \* \* \*